US010272391B2

(12) United States Patent
Atieh et al.

(10) Patent No.: US 10,272,391 B2
(45) Date of Patent: *Apr. 30, 2019

(54) PROCESS FOR FORMING A SINTERED IRON OXIDE IMPREGNATED CARBON NANOTUBE MEMBRANE

(71) Applicant: KING FAHD UNIVERSITY OF PETROLEUM AND MINERALS, Dhahran (SA)

(72) Inventors: Muataz Ali Atieh, Dhahran (SA); Ihsanullah, Dhahran (SA); Tahar Laoui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 116 days.

This patent is subject to a terminal disclaimer.

(21) Appl. No.: 15/651,688

(22) Filed: Jul. 17, 2017

(65) Prior Publication Data
US 2017/0312697 A1    Nov. 2, 2017

Related U.S. Application Data

(63) Continuation of application No. 14/919,331, filed on Oct. 21, 2015, now Pat. No. 9,776,140.

(51) Int. Cl.
*C02F 1/28* (2006.01)
*C02F 1/44* (2006.01)
(Continued)

(52) U.S. Cl.
CPC ..... *B01D 67/0083* (2013.01); *B01D 67/0041* (2013.01); *B01D 69/04* (2013.01); *B01D 69/12* (2013.01); *B01D 71/021* (2013.01); *B01D 71/024* (2013.01); *C02F 1/288* (2013.01); *C02F 1/44* (2013.01); *B01D 2323/08* (2013.01);
(Continued)

(58) Field of Classification Search
None
See application file for complete search history.

(56) References Cited

U.S. PATENT DOCUMENTS 8,038,926 B2    10/2011    Gogotsi et al.

FOREIGN PATENT DOCUMENTS

CN    103343477 A    10/2013

OTHER PUBLICATIONS

Tsoufis, T., et al., "Controlled preparation of carbon nanotube—iron oxide nanoparticle hybrid materials by a modified wet impregnation method", J. Nanopart Res, vol. 15, No. 1924, pp. 1-18, (2013).

*Primary Examiner* — Krishnan S Menon
(74) *Attorney, Agent, or Firm* — Oblon, McClelland, Maier & Neustadt, L.L.P.

(57) ABSTRACT

A process for making an iron oxide impregnated carbon nanotube membrane. In this template-free and binder-free process, iron oxide nanoparticles are homogeneously dispersed onto the surface of carbon nanotubes by wet impregnation. The amount of iron oxide nanoparticles loaded on the carbon nanotubes range from 0.25-80% by weight per total weight of the doped carbon nanotubes. The iron oxide doped carbon nanotubes are then pressed to form a carbon nanotube disc which is then sintered at high temperatures to form a mixed matrix membrane of iron oxide nanoparticles homogeneously dispersed across a carbon nanotube matrix. Methods of characterizing porosity, hydrophilicity and fouling potential of the carbon nanotube membrane are also described.

8 Claims, 8 Drawing Sheets

(51) Int. Cl.
*B01D 67/00* (2006.01)
*B01D 69/04* (2006.01)
*B01D 69/12* (2006.01)
*B01D 71/02* (2006.01)
*C02F 101/10* (2006.01)
*C02F 103/08* (2006.01)

(52) U.S. Cl.
CPC ...... *B01D 2323/46* (2013.01); *B01D 2325/02* (2013.01); *C02F 2101/10* (2013.01); *C02F 2103/08* (2013.01); *C02F 2305/08* (2013.01)

PROCESS FOR FORMING A SINTERED IRON OXIDE IMPREGNATED CARBON NANOTUBE MEMBRANE

CROSS-REFERENCE TO RELATED APPLICATIONS

The present application is a continuation of Ser. No. 14/919,331 having a filing date of Oct. 21, 2015.

BACKGROUND OF THE INVENTION

Technical Field

The present invention relates to a manufacturing process in the field of nanotechnology. More particularly, the present invention relates to a process for preparing carbon nanotube membranes that are impregnated with iron oxide. The carbon nanotube membranes prepared by this process are suitable for water desalination and purification applications. Membranes containing iron oxide-impregnated carbon nanotubes and an iron oxide binder and/or matrix are also included in the invention.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water is the non-substitutional natural resource and most essential substance for all life on earth. Reliable access to clean and affordable water is considered to be one of the most basic humanitarian goals, and remains a major challenge for the $21^{st}$ century. Good quality water (i.e. pollutant-free water) is not only crucial for human health but also as an essential feedstock for various industries including petrochemicals, oil and gas, food and pharmaceuticals.

Our current water supply faces massive challenges, both old and new. Worldwide, some 780 million people still lack access to safe drinking water (WHO, 2012) [Qu X, Alvarez P J J, Li Q. Applications of nanotechnology in water and wastewater treatment. Water Res 2013. 47: 3931-3946—incorporated herein by reference in its entirety]. Water use has been growing at more than twice the rate of population increase in the last century. As per a report from the United Nations (UN), by 2025, 1800 million people will be facing absolute water scarcity, and two-thirds of the world population could be under stress conditions [Qu X, Alvarez Pill, Li Q. Applications of nanotechnology in water and wastewater treatment. Water Res 2013. 47: 3931-3946; Kar S, Bindal R C, Tewari P K. Carbon nanotube membranes for desalination and water purification: Challenges and opportunities. Nano Today 2012. 7: 385-389—each incorporated herein by reference in its entirety].

Nanotechnology has great potential in wastewater treatment for providing environmentally acceptable water. Nanomaterials have many key physicochemical properties that make them suitable for water treatment. On mass balance they have higher surface area than bulk materials. Thus they are ideal building blocks for developing high capacity sorbents with the ability to be functionalized to enhance their affinity and selectivity.

Various nanostructured materials like zeolites, metal/metal-oxide nanoparticles, dendrimers and carbon nanotubes (CNTs) have been widely employed in water purification. However, carbon nanotubes are considered as a versatile and unique material due to their extraordinary electrical, thermal and mechanical properties. CNTs have been widely employed for the removal of various contaminants from aqueous solutions [Chen C, Hu J, Shao D. Li J, Wang X. Adsorption behavior of multiwall carbonnanotube/iron oxide magnetic composites for NOD and Sr(II). J Hazard Mater 2009. 64:923-928; Di Z C, Li Y H, Laun Z K, Liang J. Adsorption of chromium(VI) ions from water by carbon Nanotubes. Adsorpt Sci Technol 2004. 22:467-474; Wang S G, Gong W X, Liu X W, Yao Y W, Gao B Y, Yue Q Y. Removal of lead(II) from aqueous solution by adsorption onto manganese oxide-coated carbon nanotubes. Sep Purif Technol 2007. 58:17-23—each incorporated herein by reference in its entirety]. Various experimental studies have reported the adsorption of heavy metal ions, small molecules like hydrogen and oxygen, organic chemicals and radionuclides on different CNTs (closed- or open-ended CNTs, single walled or multiwalled) [Li Y H, Ding J, Luan Z, Di Z, Zhu Y, Xu C, Wu D, Wei B. Competitive adsorption of $Pb^{2+}$ $Cu^{2+}$ and $Cd^{2+}$ ions from aqueous solutions by multi-walled carbon nanotubes. Carbon 2003. 4:2787-2792; Chen C, Wang X. Adsorption of Ni(II) from aqueous solution using oxidized multiwall carbon nanotubes. Ind Eng Chem Res 2006. 45:9144-9149; Chen C L, Wang X K, Nagatsu M. Europium adsorption on multiwall carbon nanotube/iron oxide magnetic composite in the presence of polyacrylic acid. Environ Sci Technol 2009. 43:2362-2367; Chen C H, Huang C C. Hydrogen adsorption in defective carbon nanotubes. Sep Purif Technol 2009. 65:305-310; Gaur A, Shim M. Substrate-enhanced $O_2$ adsorption and complexity in the Raman G-band spectra of individual metallic carbon nanotubes. Phys Rev B 2008. 78:1254221-7; Varlot K M, McRae E, Pavlovsky N D. Comparative adsorption of simple molecules on carbon nanotubes dependence of the adsorption properties on the nanotube morphology. Appl Surf Sci 2002. 196: 209-215; Goering J, Kadossov E, Burghaus U. Adsorption kinetics of alcohols on single-wall carbon nanotubes: an ultrahigh vacuum surface chemistry study. J Phys Chem C 2008. 112:10114-10124; Hyung H, Kim J H. Natural organic matter (NOM) adsorption to multi-walled carbon nanotubes: effect of NOM characteristics and water quality parameters. Environ Sci Technol 2008. 42: 4416-4421—each incorporated herein by reference in its entirety].

CNTs have recently attracted considerable attention for synthesis of novel membranes with attractive features for water purification [Iijima S, Ichihashi, T, Ando Y. Pentagons, heptagons and negative curvature in graphite microtubule growth. Nature 1992. 356:776-778; Holt J K, Noy A, Huser T, Eaglesham D, Bakajin O. Fabrication of a carbon Nanotube-embedded silicon nitride membrane for studies of nanometer-scale mass transport. Nano Lett 2004. 4:2245-2250—each incorporated herein by reference in its entirety]. CNTs can also be used as direct filters and effective fillers to improve the membrane performance. CNTs have proven to be excellent filler in membrane due to improved permeability, rejection, disinfection and antifouling behavior. The flux through CNTs has been estimated to be 3-4 orders of magnitude faster than predicted by the Hagen-Poiseuille equation [Li S, Liao G, Liu Z, Pan Y, Wu Q, Weng Y. Zhang X, Yang Z, Tsuid O K C. Enhanced water flux in vertically aligned carbon nanotube arrays and polyethersulfone composite membranes. J Mater Chem A 2014. 2:12171-12176; Majumder M, Chopra N, Andrews R, Hinds B J. Nanoscale hydrodynamics: Enhanced flow in carbon nanotubes. Nature 2005. 438:44; Holt J K, Park H G, Wang Y, Stadermann M, Artyukhin A B Grigoropoulos C P, Noy A, Bakajin O. Fast Mass Transport Through Sub-2-Nanometer Carbon Nanotubes. Science 2006. 312:1034-1037.—each incorporated herein by reference in its entirety].

In 2004, a well-ordered nanoporous membrane structure comprising an array of aligned CNTs incorporated across a polymer film was introduced [Kar S, Bindal R C, Tewari P K. Carbon nanotube membranes for desalination and water purification: Challenges and opportunities. Nano Today 2012. 7: 385-389; Hinds B J, Chopra N, Andrews R, Gavalas V, Bachas L G. Aligned Multi ailed Carbon Nanotube Membranes. Science 2004; 303:62-65—each incorporated herein by reference in its entirety]. Subsequent to these efforts, a group of researchers studied how fluid moves through nano-sized devices [Holt J K, Park H G, Wang Y, Stadermann M, Artyukhin A B, Grigoropoulos C P, Noy A, Bakajin O. Fast Mass Transport Through Sub-2-Nanometer Carbon Nanotubes. Science 2006. 312:1034-1037—incorporated herein by reference in its entirety]. In the literature, different approaches have been reported by researchers for the synthesis of CNT based membranes. These approaches include but are not limited to:

1. Template-assisted open-ended CNT membranes, in which carbonaceous materials are deposited inside pre-existing ordered porous membranes, e.g anodized alumina [Miller S A, Young V Y, and Martin C R. Electroosmotic Flow in Template-Prepared Carbon Nanotube Membranes. J Am Chem Soc 2001. 123:12335-12342; Chengwei W, Menke L, Shanlin P, Hulin L. Well-aligned carbon nanotube array membrane synthesized in porous alumina template by chemical vapor deposition. Chin Sci Bull 2000. 45:1373-1376—each incorporated herein by reference in its entirety];

2. Aligned-array outer-wall CNT membranes in which the interstices between vertical array of CNT serves as membrane [Srivastava A, Srivastava O N, Talapatra S, Vajtai R, Ajayan P M. Carbon nanotube filters. Nature Materials 2004. 3:610-614—incorporated herein by reference in its entirety];

3. Vertically aligned open-ended CNTs surrounded by an inert polymer or ceramic matrix, or open-ended CNT/polymer composite membranes [Holt J K, Park H G, Wang Y, Stadermann M, Artyukhin A B, Grigoropoulos C P, Noy A, Bakajin O. Fast Mass Transport Through Sub-2-Nanometer Carbon Nanotubes. Science 2006. 312:1034-1037; Hinds B J, Chopra N, Andrews R, Gavalas V, Bachas L G. Aligned Multiwalled Carbon Nanotube Membranes. Science 2004. 303:62-65—each incorporated herein by reference in its entirety];

4. Membranes composed of nanotubes in the form of a thin mat, also known as buckypaper membranes [Pham G T, Park Y B, Wang S, Liang Z, Wang B, Zhang C, Funchess P, Kramer L. Mechanical and electrical properties of polycarbonate nanotube buckypaper composite sheets. Nanotechnology 2008. 19:325705; Dumee L. F. Sears K, Schutz J, Finn N, Huynh C, Hawkins S, Duke M, Gray S. Characterization and evaluation of carbon nanotube Bucky-Paper-membranes for direct contact membrane distillation. J Membr Sci 2010. 351:36-43; Cooper S M, Chuang H F, Cinke M, Cruden B A, Meyyappan M. Gas permeability of a buckypaper Membrane. Nano Lett 2003. 3:189-192—each incorporated herein by reference in its entirety].

5. Multistacked membranes of aligned CNT bundles [Andrews R, Jacques D, Rao A M, Derbyshire F, Qian D, Fan X, Dickey E C, Chen J. Continuous production of aligned carbon nanotubes: A step closer to commercial realization. Chem Phys Lett 1999. 303: 467-474—incorporated herein by reference in its entirety];

6. Mixed-matrix membranes, where CNTs are used as fillers in a polymer matrix [Ma Y, Shi F, Wang Z, Wu M, Ma J, Gao C. Preparation and characterization of PSf/clay nanocomposite membranes with PEG 400 as a pore forming additive. Desalination 2012; 286:131-137; Ebert K, Fritsch D, Koll J, Tjahjawiguna C. Influence of inorganic fillers on the compaction behaviour of porous polymer based membranes. J Membr Sci 2004. 233: 71-78; Majeed S, Fierro D, Buhr K, Wind J, Du B, Fierro A B D, Abetz, V. Multi-walled carbon nanotubes (MWCNTs) mixed polyacrylonitrile (PAN) ultrafiltration membranes. J Membr Sci 2012. 403-404: 101-109; Arockiasamy D L, Alam J, Alhoshan M. Carbon nanotubes-blended poly(phenylene sulfone) membranes for ultrafiltration applications. Appl Water Sci 2013. 3:93-103; Wu H, Tang B, Wu P. Novel ultrafiltration membranes prepared from a multi-walled carbon nanotubes/polymer composite. J Membr Sci 2010. 362:374-383; Shah P, Murthy C N. Studies on the porosity control of MWCNT/polysulfone composite membrane and its effect on metal removal. J Membr Sci 2013. 437:90-98—each incorporated herein by reference in its entirety].

Among the categories above, the mixed-matrix membrane has gained considerable attention due to ease of synthesis and broad applications. Different nanoparticles such as $TiO_2$, $Al_2O_3$, $ZrO_2$ and $SiO_2$ can be employed as a filler material for the synthesis of as mixed-matrix membranes with improved performance [Li J B, Zhu J W, Zheng M S. Morphologies and properties of poly(phthalazinone ether sulfone ketone) matrix ultrafiltration membranes with entrapped $TiO_2$ nanoparticles. J Appl Polym Sci 2006. 103: 3623-3629; Yang Y, Zhang H, Wang P, Zheng Q, Li J. The influence of nano-sized $TiO_2$ fillers on the morphologies and properties of PSf UF membrane. J Membr Sci 2007. 288: 231-238; Cao X, Ma J, Shi X, Ren Z. Effect of $TiO_2$ nanoparticle size on the performance of PVDF membrane. Appl Surf Sci 2006. 253:2003-2010; Oh S J, Kim N, Lee Y T. Preparation and characterization of VDF/$TiO_2$ organic-inorganic composite membranes for fouling resistance improvement. J Membr Sci 2009 345:13-20; Damodar R A, You S J, Chou H H. Study the self-cleaning, antibacterial and photocatalytic properties of $TiO_2$ entrapped PVDF membranes. J Hazard Mater 2009. 172:1321-1328; Wara N M, Francis L F, Velamakanni B V Addition of alumina to cellulose acetate Membranes. J Membr Sci 1995. 104:43-49; Yan L, Li Y S, Xiang C B, Xianda S. Effect of nano-sized $Al_2O_3$-particle addition on PVDF ultrafiltration membrane performance. J Membr Sci 2006. 276:162-167; Liu F, Abed M R M, Li K. Preparation and characterization of poly (vinylidene fluoride) (PVDF) based ultrafiltration membranes using nano $\gamma$-$Al_2O_3$. J Membr Sci 2011. 366:97-103; Bottino A, Capannelli G, Comite A. Preparation and characterization of novel porous PVDF-$ZrO_2$ composite membranes. Desalination 2002. 146:35-40; Nunes S P, Peinemann K V, Ohlrogge K, Alpers A, Keller M, Pires A T N. Membranes of poly(ether imide) and nano dispersed silica. J Membr Sci 1999. 157: 219-226—each incorporated herein by reference in its entirety].

Carbon nanotubes (CNTs) are also appealing membrane fillers and act as extraordinary mass transport channels as studied by various research groups. Several studies have shown successful application of CNTs in polymer matrix [Majeed S, Fierro D, Buhr K, Wind J, Du B, Fierro A B D, Abetz, V. Multi-walled carbon nanotubes (MWCNTs) mixed polyacrylonitrile (PAN) ultrafiltration membranes. J Membr Sci 2012. 403-404: 101-109; Arockiasamy D L, Alam J, Alhoshan M. Carbon nanotubes-blended poly(phenylene sulfone) membranes for ultrafiltration applications. Appl Water Sci 2013. 3:93-103; Wu H, Tang B, Wu P. Novel ultrafiltration membranes prepared from a multi-walled carbon nanotubes/polymer composite. J Membr Sci 2010. 362: 374-383; Shah P, Murthy C N. Studies on the porosity control of MWCNT/polysulfone composite membrane and its effect on metal removal. J Membr Sci 2013. 437:90-98—each incorporated herein by reference in its entirety]. Addition of CNTs has been reported to substantially increase the water flux due to hydrophilic surface and large surface pores membranes [Arockiasamy D L, Alam J, Alhoshan M. Carbon nanotubes-blended poly(phenylene sulfone) membranes for ultrafiltration applications. Appl Water Sci 2013. 3:93-103—incorporated herein by reference in its entirety]. Moreover, the tensile strength and fouling resistance of the membranes increased with addition of CNTs.

Given the above, there remains a need for carbon nanotube membranes having low fouling potential, high flux (due to high hydrophilicity and high porosity) and ease of regeneration and cleaning, as well as a simple, low-cost manufacturing process thereof.

BRIEF SUMMARY OF THE INVENTION

In a first aspect, the present disclosure provides a process for fabricating an iron oxide impregnated carbon nanotube membrane. The process comprises dispersing iron oxide nanoparticles onto the surface of carbon nanotubes to produce iron oxide impregnated carbon nanotube particles; pressing the iron oxide impregnated carbon nanotube particles to form an iron oxide impregnated carbon nanotube disc; and sintering the carbon nanotube disc to produce the iron oxide impregnated carbon nanotube membrane.

In at least one embodiment, the wet impregnation comprises dissolving a ferric salt in a first alcohol solvent to form a ferric salt solution having a concentration of 1-600 mM; dissolving carbon nanotubes in a second alcohol solvent to form a carbon nanotube solution having a concentration of 25-100 g/L; mixing and ultrasonicating the ferric salt solution and the carbon nanotube solution for 1-5 h to form a homogeneous carbon nanotube-ferric salt mixture; and evaporating alcohol from the carbon nanotube-ferric salt mixture and calcinating the carbon nanotube-ferric salt mixture at 300-40° C. to produce the iron oxide impregnated carbon nanotube particles. The ferric salt solution and the carbon nanotube solution are of equal volumes or of volumes that differ by no more than 20-25%.

In one or more embodiments, 0.25% to 80% of the iron oxide nanoparticles by weight per total weight of the iron oxide impregnated carbon nanotube particles are dispersed onto the surface of the carbon nanotubes.

In certain embodiments, during the calcinating, ferric ions in the ferric salt solution are oxidized to form the iron oxide nanoparticles and the iron oxide nanoparticles are attached to and homogeneously dispersed across the surface of the carbon nanotubes.

In one or more embodiments, the iron oxide impregnated carbon nanotube particles are pressed at 50-500 MPa.

In one embodiment, the carbon nanotube disc is sintered at 1000-1500° C. for 3-8 h at a heating rate of 5-20° C./min.

In one embodiment, the fabrication process excludes the use of a non-metallic binder.

In one embodiment, the fabrication process excludes the use of a template.

In a second aspect, the present disclosure provides a carbon nanotube membrane that comprises a matrix comprising a plurality of carbon nanotubes where the plurality of carbon nanotubes is randomly oriented along a two-dimensional singular axis and is impregnated with iron oxide nanoparticles on the surface. The carbon nanotube membrane is binder-free.

In at least one embodiment, the carbon nanotube membrane has an iron oxide nanoparticle content of 0.25-80% by weight per total weight of the carbon nanotube membrane.

In some embodiments, no iron oxide nanoparticles are embedded in the inner wall of the plurality of carbon nanotubes.

In some embodiments, the carbon nanotube membrane has a carbon nanotube density of at least $10^{10}$ cm$^{-2}$.

In some embodiments, the carbon nanotube membrane has a porosity of 50-80%.

In some embodiments, the carbon nanotube membrane has a total pore volume of 0.05-0.5 cm$^3$/g.

In some embodiments, the carbon nanotube membrane has an average pore diameter of 0.05-10 μm.

In one embodiment, the iron oxide nanoparticle content of the membrane is at least 20% and the iron oxide nanoparticles partially aggregate to form pores having an average diameter of 0.05-10 μm on the carbon nanotube membrane.

In some embodiments, the carbon nanotube membrane of has a water contact angle of 5-75°.

In some embodiments, the carbon nanotube membrane of has a water flux of 20-2000 Lm$^{-2}$ h$^{-1}$.

In a third aspect, the present disclosure relates to a method for desalinating an aqueous sample. The method comprises contacting the aqueous sample with the carbon nanotube membrane.

In a fourth aspect, the present disclosure relates to a water desalination system comprising one or more of the carbon nanotube membranes in accordance with the second aspect of the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

The present disclosure adopts a polymer-free, binder-free and template-free approach to the manufacturing of a carbon nanotube membrane. Conventional synthesis processes in the art typically involve the embedment of nanoparticles inside the walls of carbon nanotubes which are prepared using the chemical vapor deposition technique. In the process provided by the present disclosure, nanoparticles are loaded on the surface of the carbon nanotubes and embedment of the nanoparticles inside the walls of the carbon nanotubes is avoided.

Figure 1:
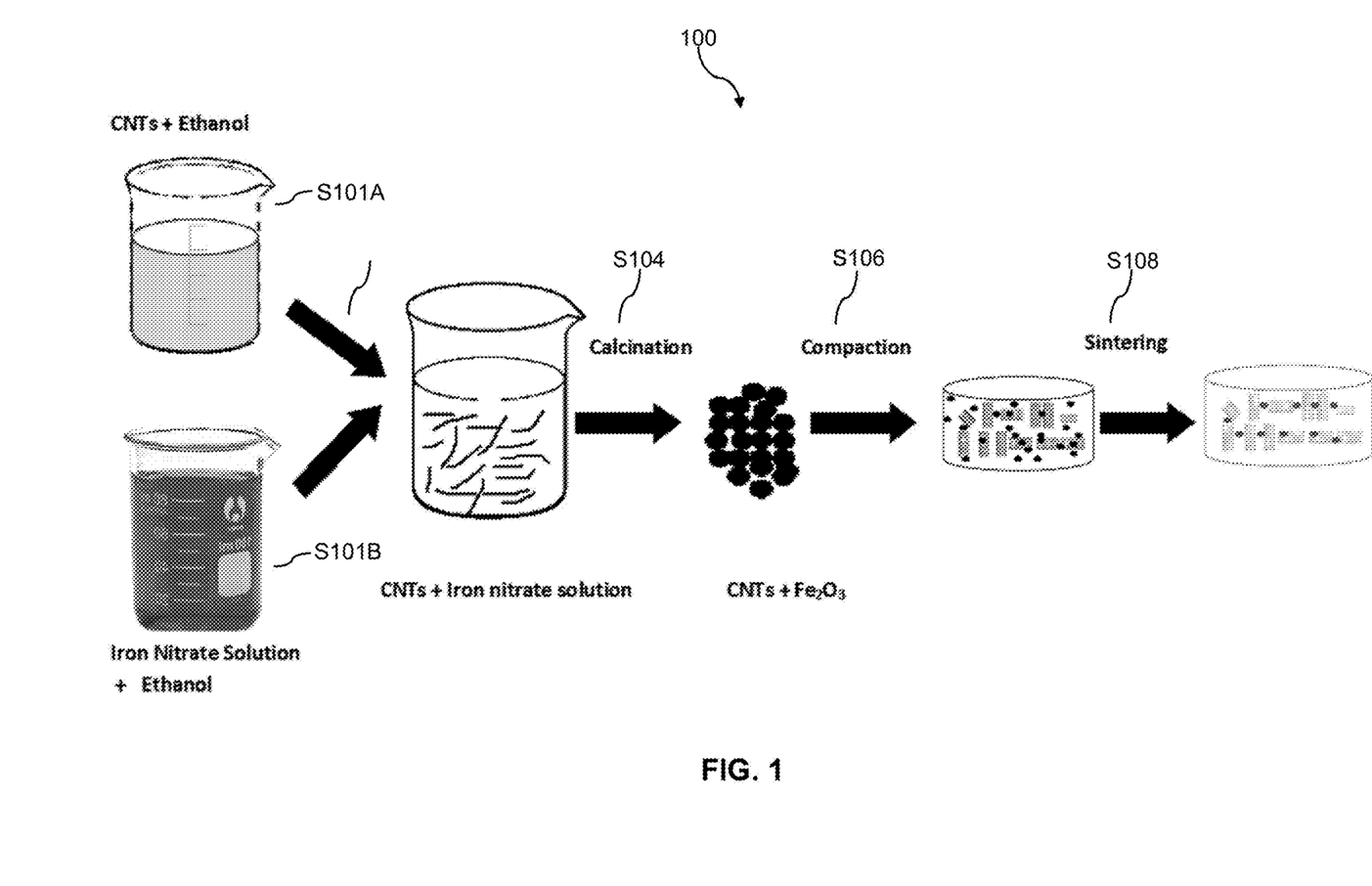
FIG. 1 illustrates the synthesis process for iron oxide impregnated carbon nanotube membranes according to one embodiment.

Referring to FIG. 1, wherein a process 100 for the preparation of an iron oxide impregnated carbon nanotube membrane according to one embodiment of the present disclosure is depicted. To prepare a mixed-matrix membrane of homogeneously dispersed carbon nanotubes and iron oxide nanoparticles, at step 102, the iron oxide nanoparticles are loaded and dispersed onto the surface of the carbon nanotubes by a wet impregnation technique. The amount of iron oxide nanoparticles loaded range from 0.25% to 80% by weight per total weight of the iron oxide doped carbon nanotube particles, preferably 0.5% to 75%, more preferably 0.75% to 60%, most preferably 1.0% to 50%. The loaded iron oxide nanoparticles are predominantly on the surface of the carbon nanotubes, with the amount of iron oxide nanoparticles that is embedded in the inner wall of the carbon nanotubes being no more than 5.0% by weight per total weight of the loaded iron oxide nanoparticles, preferably 0.05-5.0%, more preferably 0.1-2.5%, most preferably 0.5-2.0%. In one embodiment there are no nanoparticles loaded inside the core of the nanotubes.

For purposes of the present disclosure, the term in "carbon nanotubes" or "CNTs" refers to allotropes of carbon having an elongated tubular or cylindrical structure or bodies which is typically only a few atoms in circumference. Carbon nanotubes are hollow and typically have a linear fullerene structure and one or more inner walls. The carbon nanotube membrane of the present disclosure may be prepared using single-walled nanotubes (SWNTs), multi-walled nanotubes (MWNTs) or double-walled nanotubes (DWNTs). In certain embodiments, the carbon nanotubes used in the process for making a carbon nanotube membrane have an outer diameter of 5-50 nm, preferably 7.5-25 nm, more preferably 10-20 nm, and a length of 0.1-100 µm, preferably 0.5-50 µm, more preferably 1-20 µm. In one embodiment, the carbon nanotubes have an outer diameter of 10-20 nm and a length of 1-10 µm, thereby resulting in a length-to-diameter ratio of 50-1000, preferably 100-750, more preferably 250-500. The carbon nanotubes used for the making of the carbon nanotube membrane may be synthesized using any conventional technique including but not limited to arc discharge, laser ablation, high-pressure carbon monoxide disproportionation and chemical vapor deposition (CVD), and are not so limited. The carbon nanotubes used have a purity of 95% or higher, preferably ≥98%, more preferably ≥99%, with an ash content of less than 1.5 wt. %, preferably less than 1.0%, more preferably less than 0.75 wt. %. The specific surface area of the carbon nanotubes is at least 200 $m^2/g$, preferably 200-750 $m^2/g$, more preferably 250-500 $m^2/g$. The electrical conductivity of the carbon nanotubes is at least $10^2$ s/cm, preferably $10^2$-$10^5$ s/cm, more preferably $10^3$-$10^4$ s/cm.

In one embodiment, the wet impregnation of the carbon nanotube with iron oxide (step S102) is accomplished as follows: Two alcohol solutions such as ethanol or isopropyl alcohol are prepared separately at steps 101A and 101B. Preferably, the two alcohol solutions are of equal or near equal volumes, differing by no more than 20-25%. In one embodiment, the first alcohol solution has a volume of 500 mL while the second alcohol solution has a volume of 400 mL. The first alcohol solution is prepared, at step S101A, by dissolving a ferric salt in the alcohol solvent to a concentration of 1 mM to 600 mM, preferably 3 mM to 550 mM, more preferably 4 mM to 450 mM, most preferably 5 mM to 400 mM. Examples of the ferric salt include but are not limited to anhydrous or hydrated ferric nitrate, ferric acetylacetonate, ferric chloride, ferric tartrate, ferric sulfate, ferric trifluoromethanesulfonate, ferric pyrophosphate, ferric ferrocyanide, ferric perchlorate, ferric phosphate, ferric bromide, ferric oxalate, ferric citrate, ferric p-toluenesulfonate and ferric fluoride. In one embodiment, the ferric salt is ferric nitrate. Then, at step S101B, to the alcohol solvent, carbon nanotubes are added to a concentration of 25-100 g/L, preferably 30-75 g/L, more preferably 40-60 g/L. The carbon nanotube solution and the iron solution and then mixed together and agitated at room temperature, at ultrasonic frequencies of >20 kHz for at least 45 min, preferably 1-5 h, more preferably 1-3 h, even more preferably 1-2 h. During the ultrasonic treatment, the carbon nanotubes and the iron particles are thoroughly and homogeneously wetted, which is crucial towards the subsequent bonding or adherence of the two materials.

Advantageously in one embodiment, the carbon nanotube solution and the iron solution are individually sonicated (ultrasonication preferred) for 30-60 min prior to the mixing.

Next, at step S104, alcohol is evaporated from the carbon nanotube-iron mixture which is then calcined at 300-450° C., preferably 325-425° C., more preferably 350-400° C. During calcination, the ferric ions are oxidized to form iron oxide nanoparticles that are attached to and homogeneously dispersed across the surface of carbon nanotubes.

At step S106, the iron oxide doped carbon nanotube particles are shaped. In one embodiment, the iron oxide doped carbon nanotube particles are mounted onto a forming die machine then pressed and molded into a disc. The amount of pressure applied by the die ranges 50-500 MPa, preferably 75-375 MPa, more preferably 100-300 MPa. In one embodiment, the iron oxide impregnated carbon nanotube particles are pressed at 200 MPa. Suitable dies that can be used to mold and press the iron oxide impregnated carbon nanotubes include but are not limited to steel-rule dies, hex rethreading dies, round adjustable dies, NPT (National Pipe Thread) dies, NPS (National Pipe Straight) dies, British standard hex dies and square dies. The dies may be made of steel, copper, brass, graphite or any other suitable metals, semimetals and alloys. Depending on the application, the dies can have a diameter ranging from 12-450 mm, preferably 12-100 mm, more preferably 12-45 mm and a thickness of 1-25 mm, preferably 2-20 mm, more preferably 3-15 mm, thereby producing iron oxide impregnated carbon nanotube discs having the same dimensions. It should be noted, however, that the synthesis process 100 and the disc and the final carbon nanotube membrane product are not limited by the dimensions of the pressing dies.

The iron oxide impregnated carbon nanotube disc formed by the die pressing is sintered at 1000-1500° C., preferably 1100-1400° C., more preferably 1250-1350° C., with a heating rate of 5-20° C./min. The sintering is carried out for 3-8 h, preferably 4-7 h, more preferably 5-6 h in order to compact, densify and consolidate the disc into a membrane.

In an alternative embodiment, the iron oxide impregnated carbon nanotube particles are compacted and densified by spark plasma sintering (SPS). As used herein, "spark plasma sintering" (SPS), which is also known as "field assisted sintering technique" (FAST) or "pulsed electric current sintering" (PECS), is a sintering technique, in which the pulsed DC current directly passes through a graphite die, as well as the pressed powder compact. Joule heating has been found to play a dominant role in the densification of powder compacts, which results in near theoretical density at lower sintering temperature compared to conventional sintering techniques. The heat generation is internal, in contrast to the conventional hot pressing, where the heat is provided by external heating elements. This facilitates a very high heating or cooling rate, hence the sintering process generally is very fast. The general speed of the process ensures it has the potential of densifying powders with nanosize or nanostructure while avoiding coarsening which accompanies standard densification routes.

The SPS sintering may be carried out under argon atmosphere with partial vacuum at a pressure of no higher than 0.75 MPa being applied in the SPS chamber or furnace, preferably 0.1-0.75 MPa, more preferably 0.1-0.5 MPa, 0.1-0.25 MPa and 0.25-0.5 MPa. The SPS heating rate is significantly higher than the heating rate of conventional sintering techniques at 300° C. min$^{-1}$ to 1000° C. min$^{-1}$, preferably 400° C. min$^{-1}$ to 1000° C. min$^{-1}$, more preferably 500° C. min$^{-1}$ to 1000° C. min$^{-1}$, even more preferably 600° C. min$^{-1}$ to 1000° C. min$^{-1}$. The SPS treatment period is typically much shorter than conventional sintering duration, lasting 2-10 min, preferably 2-8 min, more preferably 3-8 min, 4-7 min, 4-6 min, 5-7 min, 3-5 min 3-4 min 4-5 min, 5-6 min and 6-7 min. The SYS temperature is no higher than 1000° C., for example, 500° C. to 1000° C., preferably 550° C. to 850° C., more preferably 600° C. to 700° C., even more preferably 625° C. to 675° C.

The carbon nanotube membrane fabrication process described herein excludes the use of a non-metallic binder. Instead, the iron oxide nanoparticles serve as a binding agent for holding the carbon nanotubes together in the matrix after the sintering. As used herein, a non-metallic binder is an agent that enhances the binding of iron oxide nanoparticles to the carbon nanotube matrix, which is commonly an organic polymer that is preferably crosslinked, an organosilicon compound or a ceramic sol. Examples of non-metallic binders include but are not limited to tetraorthosilicate (TEOS), methyltrimethoxysilane (MTMS), tetramethylsilane (TMS), trichlorosilane (TCS), vinyltrimethoxysilane (VTMS), phenyltrimethoxysilane (PTMS), polyethyleneimine (PEI), polysiloxane and poly(3,4-ethylenedioxythiophene). These binders may be further functionalized, for example, with halide, nitro and amino groups.

The carbon nanotube membrane fabrication process further excludes the use of a template, such as but not limited to an alumina template, a silica template and an aluminosilica template.

The carbon nanotube membrane, as synthesized according to the process provided herein, is a polymer-free mixed-matrix membrane where homogeneously dispersed carbon nanotubes form a carbon nanotube matrix and iron oxide nanoparticles are homogeneously dispersed in channels that exist between the nanotubes. The membrane is also substantially free of non-metallic binders and/or organic binders, with a non-limiting list of examples thereof provided above in the present disclosure. The amount of iron oxide nanoparticles contained in the mixed-matrix membrane can vary from 0.25% to 80% by weight per total weight of the membrane, preferably 0.5% to 75%, more preferably 0.75% to 60%, most preferably 1.0% to 50%. The iron oxide nanoparticle size ranges from 2-95 nm, with an average diameter of 10-30 nm, preferably 10-25 nm, more preferably 10-20 nm. The carbon nanotube membrane, which can act as a filtration membrane in water purification applications, has a thickness of 1 mm to 5 mm, preferably 2 mm to 4.5 mm, 2.5 mm to 4 mm, 3 mm to 4.5 mm, more preferably 3 mm to 4 mm.

Due to the template-free manufacturing process and the subsequent pressing and sintering, the iron oxide nanoparticle-doped carbon nanotubes in the membrane are randomly oriented along a two-dimensional singular axis.

The iron oxide nanoparticle impregnated carbon nanotube membrane described herein has a carbon nanotube forest density of at least $10^{10}$ cm$^{-2}$, preferably $10^{11}$ cm$^{-2}$ to $10^{14}$ cm$^{-2}$ more preferably $10^{12}$ cm$^{-2}$ to $10^{13}$ cm$^{-2}$. The high density values are attributed to the compaction at high pressures with the die.

The carbon nanotube membrane has a porous morphology and the porosity can be measured by a variety of known techniques such as but not limited to dry-wet weight measurements, destructive methods that require a sample to be crushed (e.g. Melcher-Nutting, Russell), and gas expansion methods (e.g. with Boyle's law porosimeter). The porosity of the membrane ranges 50-80%, preferably 55-75%, more preferably 60-70%. The membrane has a total pore volume, as determined by a porosimeter by a mercury injection method or a fluid saturation method, of 0.05-0.5 cm$^3$/g, preferably 0.1-0.5 cm$^3$/g, more preferably 0.2-0.5 cm$^3$/g. In one or more embodiments, the carbon nanotube membrane is a mesoporous material having an average pore diameter of is 0.05-20 nm, preferably 0.05-15 nm, more preferably 0.05-10 nm. In some embodiments, at iron oxide nanoparticle content of 20% and above, the iron oxide nanoparticles partially aggregate and form macropores on the membrane. Such macropores have an average diameter of 0.05-20 μm, preferably 0.05-15 μm, more preferably 0.05-10 μm.

The incorporation of iron oxide nanoparticles into the carbon nanotube matrix of the membrane is found to increase the hydrophilicity or wettability of the membrane, as determined by contact angle measurements. The contact angle is the angle, conventionally measured through the liquid, where a liquid or vapor interface meets with a solid surface, which in the case of the present disclosure, is the carbon nanotube membrane. The contact angle quantifies the hydrophilicity or wettability of the solid surface by the a the liquid via the Young equation:

$$\gamma^{sv} = \gamma^{sl} + \gamma^{lv} \cos\theta \quad \text{(Eq. 1)}$$

where $\theta$ is the contact angle, $\gamma^{sl}$ is the solid/liquid interfacial free energy, $\gamma^{sv}$ is the solid surface free energy and $\gamma^{lv}$ is the liquid surface free energy. The contact angle of the carbon nanotube membrane surface with water can be measured by methods such as but not limited to static sessile drop method, pendant drop method, dynamic Wilhelmy method, single-fiber Wilhelmy and Washburn's equation capillary rise method. The carbon nanotube membrane has a contact angle of 5-75°, preferably 10-60°, more preferably 15-55°. The contact angle generally decreases with the increase in iron oxide content in the membrane, thereby indicating an increase in hydrophilicity.

Hydrophilicity and porosity are two main factors determining water flux or transport through a membrane. In general, the more hydrophilic a membrane is, the higher the water flux is. Similarly, in general, high porosity also leads to high water flux of the membrane. In the present case, increasing the iron oxide content in the carbon nanotube membrane achieves both an increase in hydrophilicity and in porosity, which are both favorable towards the water flux. A carbon nanotube membrane of the present disclosure exhibits a flux of 20-2000 $Lm^{-2} h^{-1}$, preferably 50-1800 $Lm^{-2} h^{-1}$, more preferably 100-1600 $Lm^{-2} h^{-1}$, even more preferably 200-1500 $Lm^{-2} h^{-1}$, which can be sustained for up to 180 min, preferably 30-180 min, more preferably 60-180 min. An increase in transmembrane pressure also boosts the water flux, and a suitable transmembrane pressure for the carbon nanotube membrane is 0.5-100 psi, preferably 1-80 psi, more preferably 20-50 psi.

The present disclosure further relates to a method for treating and/or desalinating an aqueous sample with a carbon nanotube membrane described herein, as well as water purification/filtration/desalination devices and systems incorporating the carbon nanotube membrane. As used herein, the term in "desalination" refers to a process for removal of salts and minerals from an aqueous sample in order to produce potable water that is safe for not only ingestion but also a variety of domestic and industrial uses. Among the heavy metals removed with the carbon nanotube membrane of the present disclosure include but are not limited to cadmium, arsenic, mercury, lead, chromium, zinc and copper. Among the minerals removed by desalination with the carbon nanotube membrane of the present disclosure include but are not limited to sodium, potassium, calcium, magnesium, chloride, fluoride, bromide, sulfate, sulfide, nitrate, bicarbonate and carbonate. Examples of an aqueous sample that may be treated with the method include but are not limited to drinking water, sea water, brackish water, saline water, wastewater, industrial effluent water, brine and salt water.

In the water treatment/desalination method, the aqueous sample is contacted with the carbon nanotube membrane for at least 15 min, preferably 30 min to 8 h, more preferably 1-6 h, even more preferably 2-4 h. In some embodiments, the desalination process can be enhanced, for example, by increasing the transmembrane pressure, increasing flux through the membrane and/or increasing temperature of the desalination system from ambient temperature to 50-65° C.

A water desalination/water treatment device, as used herein, refers to a single device that is configured to remove heavy metals, salts and minerals from an aqueous sample. Similarly, a desalination/water treatment system, as used herein, refers to a multi-device system that is configured to do the same. Components of a desalination/water treatment system of the present disclosure include but are not limited to a water tank, a pump, a flow controller, one or more iron oxide impregnated carbon nanotube membranes, a column containing the membranes, a sample collection point and a control valve. The iron oxide impregnated carbon nanotube membrane prepared according to the process described herein has a fouling potential for sodium alginate (SA). The permeate flux and rejection rate of sodium alginate (SA) were determined to predict the antifouling behavior of the membrane. A commercial sodium alginate with reported molecular weight of 12-80 kDa were supplied by Sigma-Aldrich and employed in all these experiments. Alginate solutions at a concentration of 10 ppm were employed in each experiment, while its concentrations were measured with a total organic carbon (TOC) Schimadzu 5000 A analyzer. The ionic strength of the solution was adjusted by addition of 20 mM NaCl and pH was maintained at 7.8 by addition of 1 mM $NaHCO_3$ as a buffer solution, as reported in the literature.

Alginate solutions were pumped through the flow loop system at constant pressure of 14.7 psi, while permeated flux and concentrations were measured after equal interval of times. It was observed that permeate flux showed a minor decline after 90 min of operation. While maximum flux is still higher for membrane with 50% iron oxide content. This minor decline might be due to smaller size of alginate that may pass through the membrane pores and has no significant effect on flux. It is suggested that at the initial stage of filtration, adsorption is the main phenomenon that explains the membrane fouling by alginate molecules. After a certain contact time, for example, approximately 90 min, cake development takes place on the membrane surface, which might cause slight reduction in permeate flux.

Sodium alginate rejection by the membrane was not significant until 0.5 h of operation. This might be due to smaller molecular sizes of alginate that requires sufficient time to deposit on membrane surface and inside the pores. However, the rejection was observed to increase for all membrane with time afterwards. Maximum rejections of sodium alginate were 90% and 88%, as shown by the membrane with 10 and 1% iron oxide content, respectively. This result is not surprising due to fact that the flux through membrane with low iron oxide content is smaller and hence the longer contact time between alginate molecules and membrane surface showed improved adsorption. Furthermore, a relatively good dispersion of iron oxide and CNTs in these membranes contributes to higher rejection of sodium alginate. A membrane having a 50% iron oxide content was still able to remove 57% alginate molecules after three hours of operation.

It must be noted that, as used in the specification and the appended claims, the singular forms "a," and "the" include plural referents unless the context clearly dictates otherwise. That is, unless clearly specified otherwise, as used herein the words "a" and "an" and the like carry the meaning of "one or more."

EXAMPLES

The following examples are included to further describe protocols for preparing iron oxide impregnated carbon nanotubes and iron oxide impregnated carbon nanotube membranes, characterization and characterization results thereof. These examples are included for illustrative purposes, and are not intended to limit the scope of the invention.

To prepare a carbon nanotube membrane comprising dispersed carbon nanotubes (CNTs) and iron oxide nanoparticles, CNTs were impregnated with different amounts of iron oxide (1, 10, 20, 30 and 50 wt. % per total weight of the iron impregnated CNTs) via a wet chemistry technique. Impregnated CNTs were then compacted and sintered to form in a compact disk. In the following examples, the effect of iron oxide amount, compaction force and sintering temperature on the membrane are described. The membranes are characterized by scanning electron microscopy (SEM), EDS, BET surface area analyzer, X-ray diffraction (XRD) and thermogravimetric analysis (TGA). The density, pore size, contact angle measurement and water flux of the prepared impregnated carbon nanotube membranes are also analyzed in these examples.

In summary, as seen in the following examples, the synthesized iron oxide impregnated carbon nanotube membrane can efficiently remove heavy metals from water in a continuous flow system. The membrane characteristics were influenced by the loading of iron oxide. The iron oxides not only change the CNT properties but also served as a welding agent to hold together the CNTs. As the loading of iron oxide increased, the membrane was transformed from being hydrophobic to hydrophilic, as confirmed by contact angle measurements. Iron oxide was proven to be effective in improving the hydrophilicity of the membrane. Pure water flux was observed to increase with increase in iron oxide content. The maximum flux was observed for membrane with 50% iron oxide content. A slight reduction in flux was observed with time for all membranes. This might be due to compaction of pores after water flow for long time.

Example 1

Materials

Carbon nanotubes used in this study were supplied by Chengdu Organic Chemicals Co. Ltd. (China). Specifications of the CNTs are shown in Table 1. Iron (III) nitrate nonahydrate, $Fe(NO_3)_3 \cdot 9H_2O$ (Reagent grade, Sigma Aldrich, purity≥98%) was used as metal oxide salt for iron oxide.

TABLE 1

Chemical and physical properties of carbon nanotubes.

| Property | Value |
| --- | --- |
| Outer diameter (nm) | 10-20 |
| Length(μm) | 1-10 |
| Purity | >95% |
| Ash | <1.5 wt. % |
| Specific surface area($m^2/g$) | >200 |
| Electrical conductivity(s/cm) | >$10^2$ |

Example 2

Synthesis of Iron Oxide Impregnated Carbon Nanotubes

The surface of the CNTs was coated with iron oxide nanoparticles using a wet impregnation method. For example, for 1% iron oxide loading, 1.443 g of pure ferric nitrate [$Fe(NO_3)_3 \cdot 9H_2O$] was dissolved in 500 mL of absolute ethanol (at least 98% purity). An amount of CNTs (19.88 g) was dissolved in a second portion of absolute ethanol (400 mL). Both solutions were sonicated for 45 minutes separately and then mixed together. The resultant mixture was again sonicated for 1 hour at room temperature. The aim of ultrasonication was to have a complete and homogeneous wetting of the particles during impregnation and hence, decreasing the possibility of agglomeration due to the formation of clumps of liquid. The mixture was then kept in oven to evaporate the ethanol. The residue was then calcined for 3.5 hours at 350° C. in furnace to get CNTs impregnated with 1% iron oxide. This process leads to homogonously dispersed iron oxide nanoparticles in CNTs matrix and attachment of iron oxide to CNTs. Similarly, CNTs were impregnated with different loading of iron oxides i.e 1%, 10%, 20%, 30% and 50% by weight per total weight of the impregnated CNTs.

Example 3

X-Ray Diffraction (XRD) Analysis of Carbon Nanotubes

Figure 2:
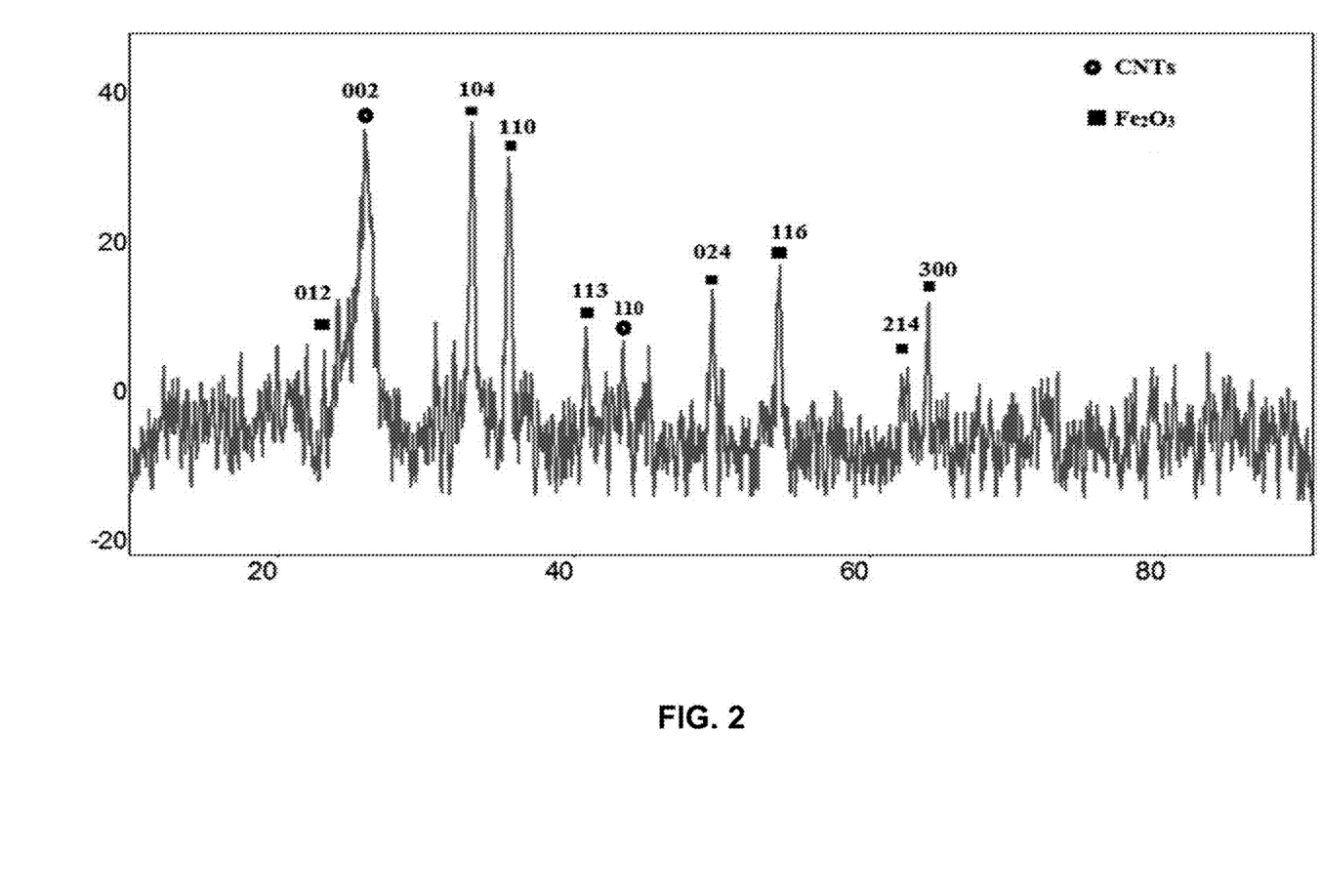
FIG. 2 illustrates the XRD pattern for the iron oxide impregnated carbon nanotube membranes.
Figure 3A:
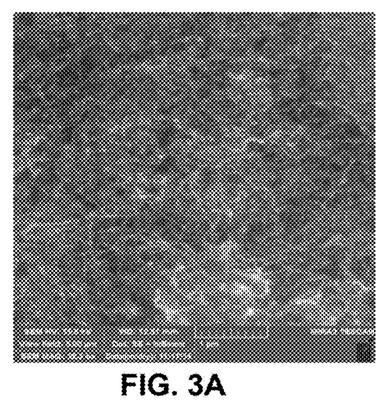
FIG. 3A is an SEM image of a sintered carbon nanotube membrane that is impregnated with 1 wt. % iron oxide.
Figure 3B:
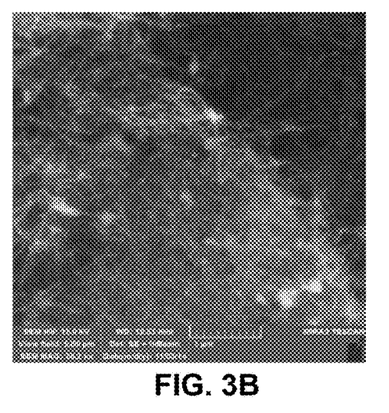
FIG. 3B is an SEM image of a sintered carbon nanotube membrane that is impregnated with 10 wt. % iron oxide.
Figure 3C:
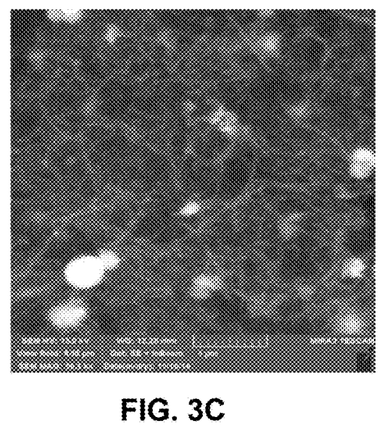
FIG. 3C is an SEM image of a sintered carbon nanotube membrane that is impregnated with 20 wt. % iron oxide.
Figure 3D:
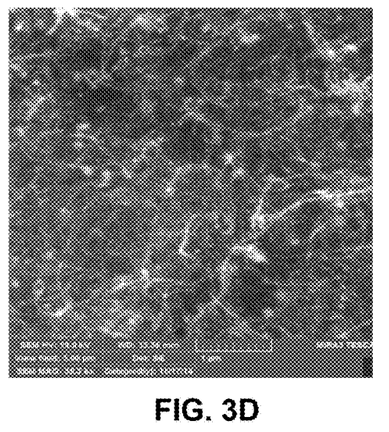
FIG. 3D is an SEM image of a sintered carbon nanotube membrane that is impregnated with 30 wt. % iron oxide.
Figure 3E:
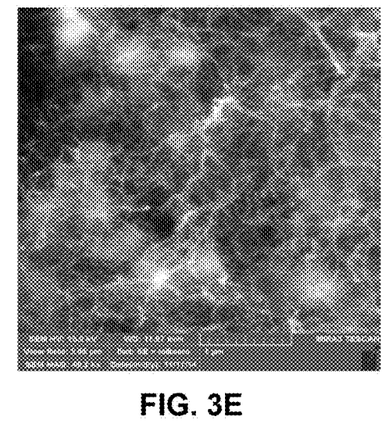
FIG. 3E is an SEM image of a sintered carbon nanotube membrane that is impregnated with 50 wt. % iron oxide.

The XRD patterns were recorded using an X-ray diffractometer, equipped with Cu KR radiation (40 kV, 20 mA) at a rate of 1.0°/min over the range of 10-80° (2α). FIG. 2 shows the XRD pattern for the impregnated CNTs. There is one characteristic peak of CNTs was observed at 2 θ of 27, while other characteristic peaks were found at 2θ, 34.36, 42, 50, 54, 63, 65, 72 and 75 which corresponds to $Fe_2O_3$ [Ramesh R, Ashok K, Bhalero G M, Ponnusamy S, Muthamizhchelvan C. Synthesis and properties of α-$Fe_2O_3$ nanorods. Cryst Res Technol 2010; 45:965-968 incorporated herein by reference in its entirety]. These results revealed that the $Fe_2O_3$ particles were successfully attached to the CNTs.

Example 4

Synthesis of Iron Oxide Impregnated Carbon Nanotube Membranes

Carbon nanotube impregnated iron oxide particles were uniaxially pressed in steel dies of 27 mm diameter, under pressure of 200 MPa. Compaction yielded a disc of φ 27 mm×3 mm containing 1, 10, 20, 30 and 50% of iron oxide by mass. These discs were sintered in a horizontal tube furnace (MTI Corporation GSL-1700X) with a programmable temperature controller. Sintering was performed at temperature of 1350° C. for 5 hours, with a heating rate of 5° C./min. Characteristics of the membranes were analyzed by SEM, EDS, XRD, porosity and contact angle measurement. A schematic diagram of the membrane synthesis process is presented in FIG. 1.

Example 5

Scanning Electron Microscopy (SEM) Analysis of Carbon Nanotube Membranes

Scanning electron microscopy for membrane was performed using Field Emission Scanning Electron Microscope (TESCAN MIRA 3 FEG-SEM). The membrane samples were sputtered with 10 nm layer of platinum. FIGS. 3A-3E shows SEM images of sintered membrane with different loading of iron oxides. It can be seen that $Fe_2O_3$ particles are dispread at lower loading, however, some aggregation was observed when amount of $Fe_2O_3$ is larger. The membrane seems to be more porous, as confirmed by porosity measurement, when iron oxide content is low. As the $Fe_2O_3$ loading increases, the porosity is reduced due to the presence of the $Fe_2O_3$ particles in the channels which exist among the CNTs.

Example 6

Porosity Measurements of Carbon Nanotube Membranes

Figure 4:
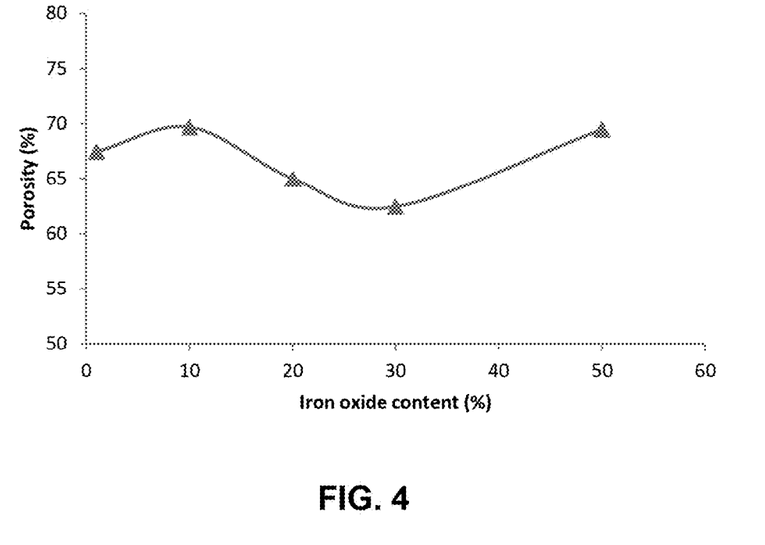
FIG. 4 is a line graph showing porosity of carbon nanotube membranes having different iron oxide content.

The porosity of the carbon nanotube membranes was measured by the dry-wet method [Majumder M, Chopra N, Andrews R, Hinds B J. Nanoscale hydrodynamics: Enhanced flow in carbon nanotubes. Nature 2005; 438:44; Ramesh R, Ashok K, Bhalero G M, Ponnusamy S, Muthamizhchelvan C. Synthesis and properties of α-$Fe_2O_3$ nanorods. Cryst Res Technol 2010; 45:965-968—each incorporated herein by reference in its entirety], using the Eq. 2:

$$Porosity=[(W_2-W_1)/V \cdot \rho] \times 100\% \quad (Eq. 2)$$

where $W_1$ (g) and $W_2$ (g) are the weight of dry membrane and wet membrane, respectively, ρ ($g/cm^3$) is the density of distilled water at room temperature, V ($cm^3$) is the volume of the membrane. Weight of wet membrane was measured after dipping into distilled water for 24 h. Then the wet membrane was dried in the oven at 90° C. for 24 h before measuring its dry weight. In order to minimize the experimental error, the experiment was repeated three times and the average value was reported in FIG. 4.

The porosity of the membrane changes slightly with increase in iron oxide content from 1 wt. % to 10 wt. %. However, a decrease in porosity was observed when the iron oxide content from 10 wt % to 30 wt. %. This might be due to the fact that, with increase in iron oxide content, the spaces between CNTs are most likely to be covered by iron oxide particles and hence reduces the porosity. However, at higher iron oxide content, the porosity again increases. This is indication of some agglomeration of iron oxide and existence of void spaces among the CNTs. This is also confirmed by SEM images of membrane with 50 wt. % iron oxide content.

Example 7

Contact Angle Measurements of Carbon Nanotube Membranes

Figure 5:
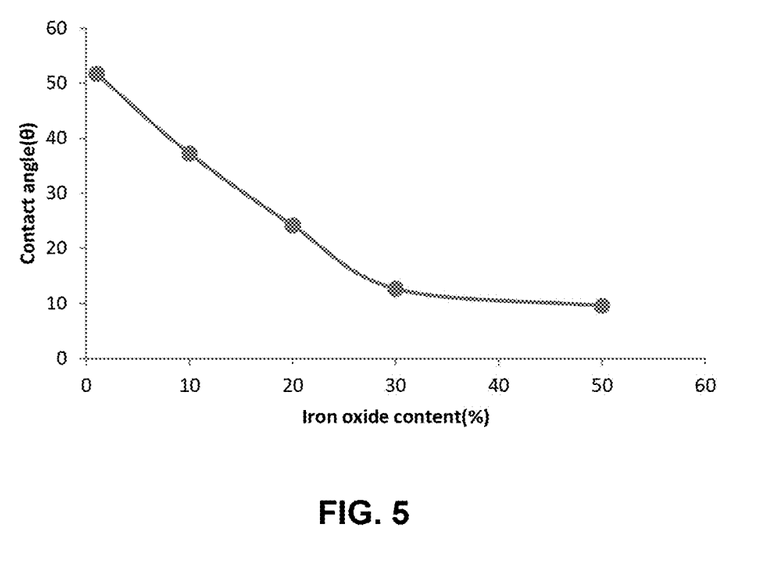
FIG. 5 is a line graph showing contact angle of carbon nanotube membranes having different iron oxide content.
Figure 6A:
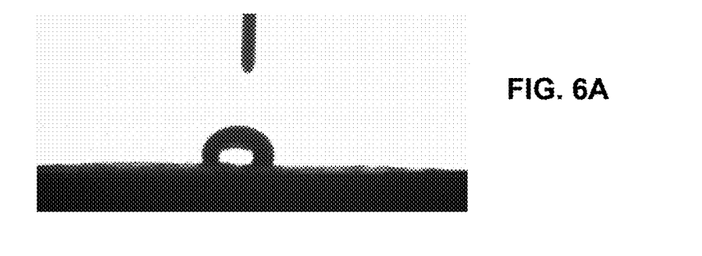
FIG. 6A illustrates measurement of contact angle of a carbon nanotube membrane having 1 wt. % iron oxide.
Figure 6B:
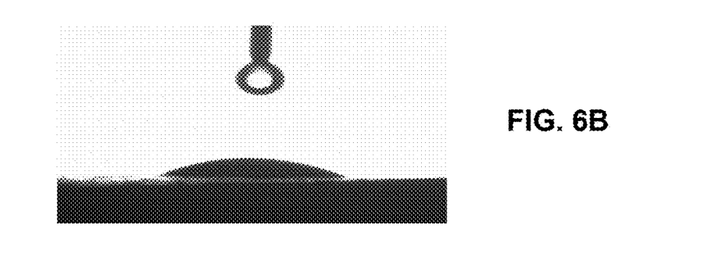
FIG. 6B illustrates measurement of contact angle of a carbon nanotube membrane having 10 wt. % iron oxide.
Figure 6C:
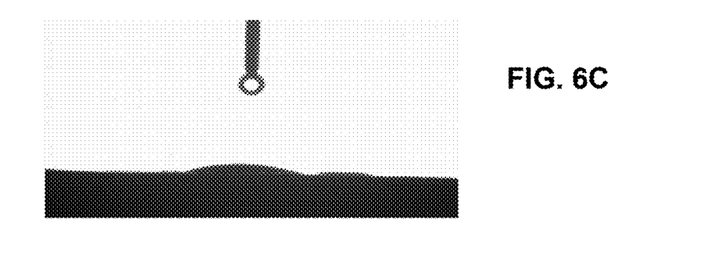
FIG. 6C illustrates measurement of contact angle of a carbon nanotube membrane having 20 wt. % iron oxide.
Figure 6D:
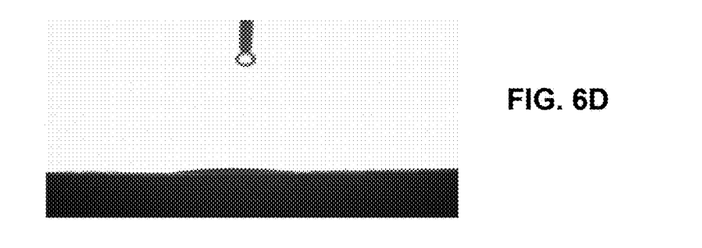
FIG. 6D illustrates measurement of contact angle of a carbon nanotube membrane having 30 wt. % iron oxide.
Figure 6E:
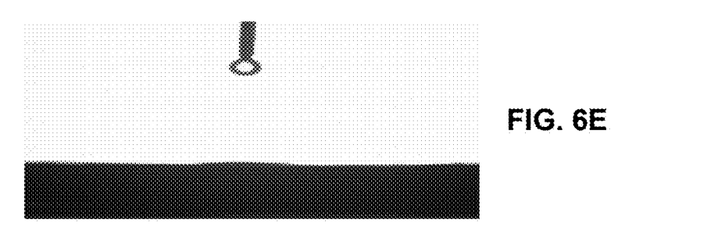
FIG. 6E illustrates measurement of contact angle of a carbon nanotube membrane having 50 wt. % iron oxide.

A contact angle is an indication of the hydrophilicity of the membrane. The contact angle of the membrane surface was measured using a contact angle analyzer (KYOWA, model DM-301). Contact angle measurements were repeated at five different areas and the mean values are presented in FIG. 5. Measurements were carried out by placing a droplet of 5 μL water on the surface carbon nanotube membranes having 1 wt. % (FIG. 6A), 10 wt. % (FIG. 6B), 20 wt. % (FIG. 6C), 30 wt. % (FIG. 6D) and 50 wt. % (FIG. 6E) of iron oxide.

It can be seen from FIGS. 5 and 6A-6E the contact angle decreases with increase in the iron oxide content in the membrane. This behavior shows an increase in the hydrophilicity of the membrane with increase in iron oxide content. The hydrophilic nature of the membrane facilitates the rapid transport of water molecules through it and thus enhanced the flux [Holt J K, Park H G, Wang Y, Stadermann M, Artyukhin A B, Grigoropoulos C P, Noy A, Bakajin O. Fast Mass Transport Through Sub-2-Nanometer Carbon Nanotubes. Science 2006. 312:1034-1037—incorporated herein by reference in its entirety].

Example 7

Water Flux Measurements of Carbon Nanotube Membranes

Figure 7:
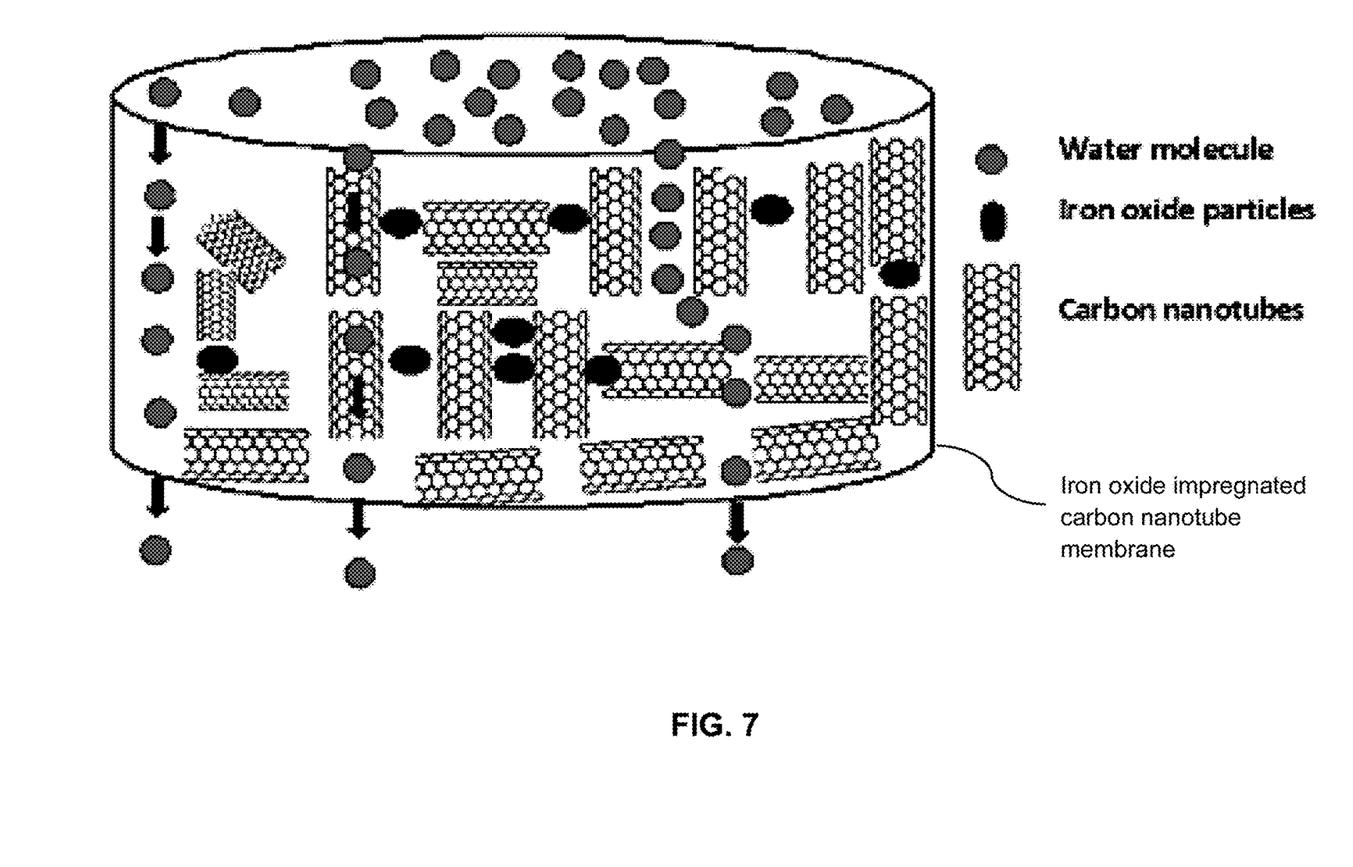
FIG. 7 is a schematic illustration of possible routes for water transport in iron oxide impregnated carbon nanotube membranes.
Figure 8:
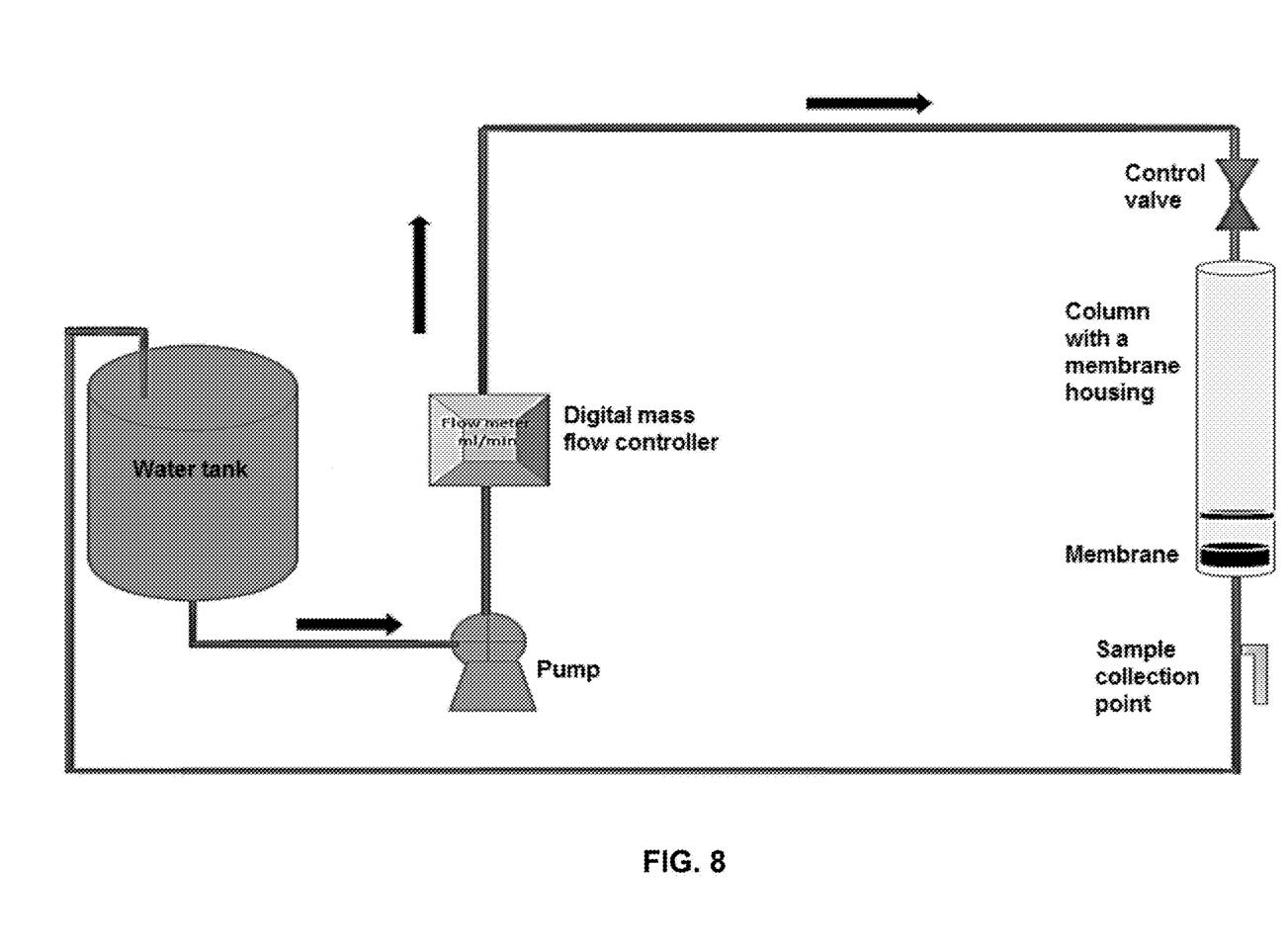
FIG. 8 is a schematic diagram of the flow loop system according to one embodiment.

Multiple possible routes for water transport in iron oxide impregnated carbon nanotube membranes are depicted in FIG. 7. Water transport through the membrane mainly depends on the hydrophilicity and porosity of the membrane. In general, flux is higher for hydrophilic membrane surface and high porosity. Water flux measurements were performed using a flow loop system, as shown in FIG. 8. The pure water flux was determined using Eq. 3:

$$J=V/(A \cdot t) \quad (Eq. 3)$$

where J is the pure water flux ($L \cdot m^{-2} \cdot h^{-1}$), V is the volume of permeate water measured in liter (L), A is membrane area ($m^2$) and t the time required for permeate water to pass through membrane (h).

Figure 9:
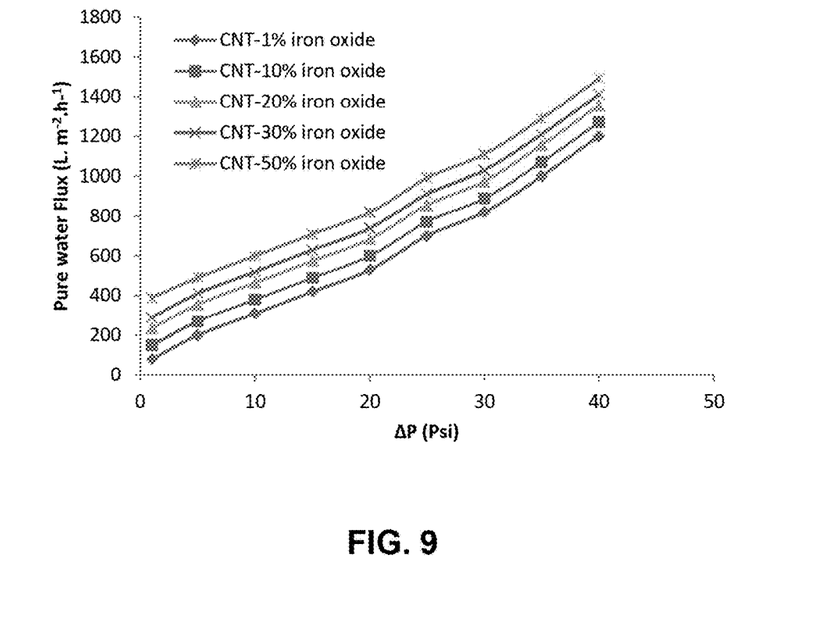
FIG. 9 is a line graph showing effect of pressure and iron oxide loading on pure water flux.
Figure 10:
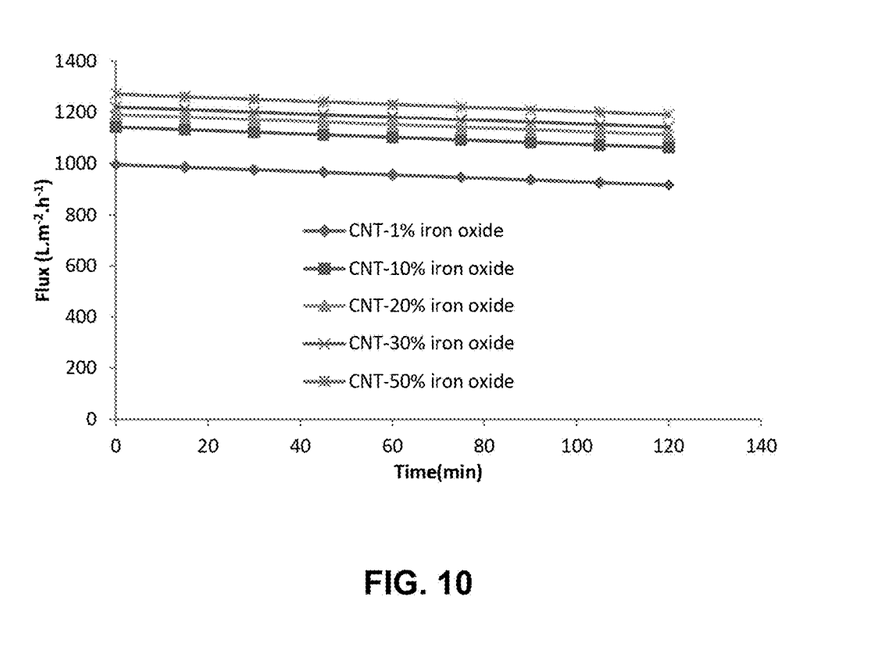
FIG. 10 is a line graph showing effect of time on pure water flux.

The pure water flux was measured under different conditions as shown in FIGS. 9 and 10. Initially, the water flux was measured at different transmembrane pressures, i.e. from 1 to 40 psi. Then the transmembrane pressure was maintained at 20 psi for 30 min and water flux was measured. The same procedure was used to obtain the flux for different pressure. Each pressure was maintained for 10 min before obtaining readings.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A process for forming a sintered iron oxide impregnated carbon nanotube membrane, comprising:
    dispersing iron oxide nanoparticles onto the surface of carbon nanotubes by wet impregnation to produce iron oxide impregnated carbon nanotube particles comprising from 1 to 50 wt. % iron oxide based on the total weight of the iron oxide impregnated carbon nanotube particles;
    pressing the iron oxide impregnated carbon nanotube particles with a die to form an iron oxide impregnated carbon nanotube disc; and
    sintering the carbon nanotube disc to produce the sintered iron oxide impregnated carbon nanotube membrane having a thickness of 1 to 5 mm.

2. The process of claim 1, wherein the wet impregnation comprises:
    dissolving a ferric salt in a first alcohol solvent to form a ferric salt solution having a concentration of 1-600 mM;
    dissolving carbon nanotubes in a second alcohol solvent to form a carbon nanotube solution having a concentration of 25-100 g/L;
    mixing and ultrasonicating the ferric salt solution and the carbon nanotube solution for 1-5 h to form a homogeneous carbon nanotube-ferric salt mixture; and
    evaporating alcohol from the carbon nanotube-ferric salt mixture and calcinating the carbon nanotube-ferric salt mixture at 300-450° C. to produce the iron oxide impregnated carbon nanotube particles;

wherein the ferric salt solution and the carbon nanotube solution are of equal volumes or of volumes that differ by no more than 20-25%.

3. The process of claim 1, wherein 0.25% to 80% of the iron oxide nanoparticles by weight per total weight of the iron oxide impregnated carbon nanotube particles are dispersed onto the surface of the carbon nanotubes.

4. The process of claim 2, wherein during the calcinating, ferric ions in the ferric salt solution are oxidized to form the iron oxide nanoparticles; and the iron oxide nanoparticles are attached to and homogeneously dispersed across the surface of the carbon nanotubes.

5. The process of claim 1, wherein the iron oxide impregnated carbon nanotube particles are pressed at 50-500 MPa.

6. The process of claim 1, wherein the carbon nanotube disc is sintered at 1000-1500° C. for 3-8 h at a heating rate of 5-20° C./min.

7. The process of claim 1, wherein the process excludes the use of a non-metallic binder.

8. The process of claim 1, wherein the process excludes the use of a template.

* * * * *